United States Patent [19]
Lim et al.

[11] Patent Number: 5,485,210
[45] Date of Patent: * Jan. 16, 1996

[54] DIGITAL ADVANCED TELEVISION SYSTEMS

[75] Inventors: Jae S. Lim, Winchester; Peter A. Monta, Cambridge, both of Mass.

[73] Assignee: Massachusetts Institute of Technology, Cambridge, Mass.

[*] Notice: The portion of the term of this patent subsequent to Jun. 8, 2010, has been disclaimed.

[21] Appl. No.: 72,738

[22] Filed: Jun. 7, 1993

Related U.S. Application Data

[63] Continuation of Ser. No. 658,192, Feb. 20, 1991, Pat. No. 5,218,435.

[51] Int. Cl.$^6$ .............................. H04N 7/12; H04N 7/13
[52] U.S. Cl. .................. 348/409; 348/413; 348/415; 348/398
[58] Field of Search ............................ 358/133, 136, 358/135, 138, 12, 13, 105, 140, 141; 382/56, 41, 43, 28; 348/394, 397, 398, 400, 401, 402, 407, 408, 409, 412, 414, 415; H04N 7/12, 7/13

[56] References Cited

U.S. PATENT DOCUMENTS

| | | | |
|---|---|---|---|
| 4,546,386 | 10/1985 | Matsumoto et al. | 358/136 |
| 4,817,182 | 3/1989 | Adelson et al. | 382/56 |
| 4,821,119 | 4/1989 | Gharavi | 358/136 |
| 4,827,336 | 5/1989 | Acampora et al. | 358/135 |
| 4,829,378 | 5/1989 | LeGall | 358/160 |
| 4,838,685 | 6/1989 | Martinez et al. | 352/85 |
| 4,853,779 | 8/1989 | Hammer et al. | 358/133 |
| 4,864,396 | 9/1989 | Martens | 358/135 |
| 4,918,524 | 4/1990 | Ansari et al. | 358/133 |
| 4,941,042 | 7/1990 | Martens | 358/133 |
| 4,943,855 | 7/1990 | Bheda et al. | 358/133 |
| 4,969,040 | 11/1990 | Gharavi | 358/136 |
| 4,987,480 | 1/1991 | Lippman et al. | 358/133 |
| 5,001,561 | 3/1991 | Haskell et al. | 348/407 |
| 5,006,929 | 4/1991 | Barbero et al. | 358/105 |
| 5,067,015 | 11/1991 | Combridge et al. | 358/133 |
| 5,136,374 | 8/1992 | Jayant et al. | 358/136 |
| 5,218,435 | 6/1993 | Lim et al. | 358/136 |
| 5,235,420 | 8/1993 | Gharavi | 358/135 |

OTHER PUBLICATIONS

Adelson et al., "Orthogonal pyramid transform for image coding," SPIE vol. 845 Visual Communications and Image Processing II, pp. 50–58 (1987).

Burt et al., "The Laplacian Pyramid as a Compact Image Code," IEEE Transactions on Communications, vol. Com–31, No. 4, pp. 532–540 (Apr. 1983).

Kovacevic et al., "Image Coding with Windowed Modulated Filter Banks," pp. 1949–1952 (1989).

Lim, *Two Dimensional Signal and Image Processing*, pp. 497–507, 632–640, 642–656 (1990).

Woods et al., "Subband Coding of Images", IEEE Transactions on Acoustics, Speech, and Signal Processing, vol. ASSP–34, No. 5, pp. 1278–1288 (Oct. 1986).

*Primary Examiner*—James J. Groody
*Assistant Examiner*—Michael H. Lee
*Attorney, Agent, or Firm*—Fish & Richardson

[57] ABSTRACT

Television images are decoded by forming a predicted current image frame, receiving and decoding a quantized subband-represented residual frame, and reconstructing a current frame by combining the decoded residual frame and a fraction of the predicted current image frame in a plurality of frequency subbands. A television signal also may be decoded to determine the state of an indicator that specifies for an entire received frame whether the received frame is an actual image frame. If the indicator specifies that the frame is an actual image frame, the frame is decoded to reconstruct the actual image and the decoded frame is used without motion compensation. If the indicator specifies that the frame is not an actual image frame, motion compensation is used to reconstruct the entire frame.

17 Claims, 6 Drawing Sheets

DIGITAL ADVANCED TELEVISION SYSTEMS

This is a continuation of application Ser. No. 07/658,192, filed Feb. 20, 1991, now U.S. Pat. No. 5,218,435 (incorporated by reference).

BACKGROUND OF THE INVENTION

The invention relates to television systems, in particular the high-resolution systems known as high definition television (HDTV).

A television broadcast consists of a sequence of still frames displayed in rapid succession. The frame rate necessary to achieve proper motion rendition is usually high enough that there are only small variations from one frame to the next (i.e., there is a great deal of temporal redundancy among adjacent frames). Much of the variation between adjacent frames is due to object motion.

A known technique for taking advantage of this limited variation between frames is known as motion-compensated image coding. In such coding, the current frame is predicted from the previously encoded frame using motion estimation and compensation, and the difference between the actual current frame and the predicted current frame is coded. By coding only the difference, or residual, rather than the image frame, itself, it is possible to improve image quality, for the residual tends to have lower amplitude than the image, and can thus be coded with greater accuracy.

Motion estimation and compensation are discussed in Lim, J. S., *Two-Dimensional Signal and Image Processing*, Prentice Hall, pp. 497–507 (1990). A frame of estimated motion vectors is produced by comparing the current and previous frames. Typically, each motion vector is simply a pair of x and y values representing estimates of the horizontal and vertical displacement of the image from one frame to the next at a particular location. The motion vectors are coded as side information. In the decoder, the current image frame is computed by summing the decoded residual with a motion-compensated version of the prior image frame. Motion compensation is typically performed on each pixel of the prior frame using bilinear interpolation between nearest motion vectors.

In a motion compensated television system, some means has to be provided for initializing the television receiver, as otherwise it has no starting point from which to construct frames from the received residuals. One technique for initialization is to periodically (e.g., once per second) transmit an original image; the receiver simply waits until it receives an original image before providing a display. Another technique is to use as the predictor not the previous frame but only, say, 98% of the previous frame. This causes the residual to contain 2% of the original image (a so-called "leakage factor"), with the result that the receiver will initialize itself over a short period of time (e.g., a one-second time constant). In a television receiver that uses either of these techniques, there can be a noticeable delay before an image is available following a change of channel. Furthermore, injecting even 2% of the original image into the residual can significantly degrade performance because the energy of the residual can be substantially increased, thus taking away from the increased accuracy by which the residual can be transmitted.

A related difficulty in motion compensated television systems is handling scene changes. In a typical scene change, there is little correlation between the current and previous frames, and thus motion estimation and compensation is not effective. A known technique for dealing with scene changes is simply to rely on the motion estimator to decide, on a block-by-block basis, whether the differences between adjacent image frames is so large as not to perform motion compensation for that block of the image. In this way, scene changes are handled using the same local, block-by-block decisions that are used for dealing with other situations in which motion compensation fails locally (e.g., rapidly moving objects that exceed the dynamic range of the motion estimator). When it is determined that a block is not to be motion compensated but is instead to be sent as an original image, information indicating such treatment is sent in place of the motion vector for that block. The decoder in the receiver initializes that block with the received pixels for the block instead of doing a motion compensated prediction for the block.

There are two principal techniques for coding images: waveform coding, in which intensity values are directly coded, and transform coding, in which the image frame is transformed to a domain significantly different from the image intensity domain, and the resulting transform "coefficients" are encoded. Transform coding is discussed in Lim, J. S., *Two-Dimensional Signal and Image Processing*, Prentice Hall, pp. 642–656 (1990). Typically, the image is divided into a plurality of blocks, and each block is separately transformed. A transform in common use is the discrete cosine transform (DCT). Objectionable "blocking" artifacts can occur in transform-coded images, particularly in those encoded with DCT. Alternatives such as the lapped orthogonal transform (LOT), in which blocks overlap, have been tried in an effort to mitigate such "blocking" artifacts.

One waveform coding technique is subband coding, in which the image is typically filtered by a bank of bandpass filters, each of essentially the same bandwidth. Each filtered image represents a different spatial frequency band. The filtered images are subsampled equally (in view of the equal bandwidths of the filters), with the result that the collection of filtered, subsampled "images" together occupy the same number of pixels as the original image.

It was shown in Baylon, D. M. and Lim, J. S., "Transform/Subband Analysis and Synthesis of Signals," pp. 540–544, 2nd Int. Symp. on Signal Processing and its Applications, Gold Coast, Australia (Aug. 24–30, 1990) that transform coding and subband coding are mathematically equivalent. The transform coefficients in block i,j of a transform frame can be made to correspond to the i,j values within each of the subbands in the subband frame by choosing the bandpass filters and transform operations consistently.

Figure 4A:
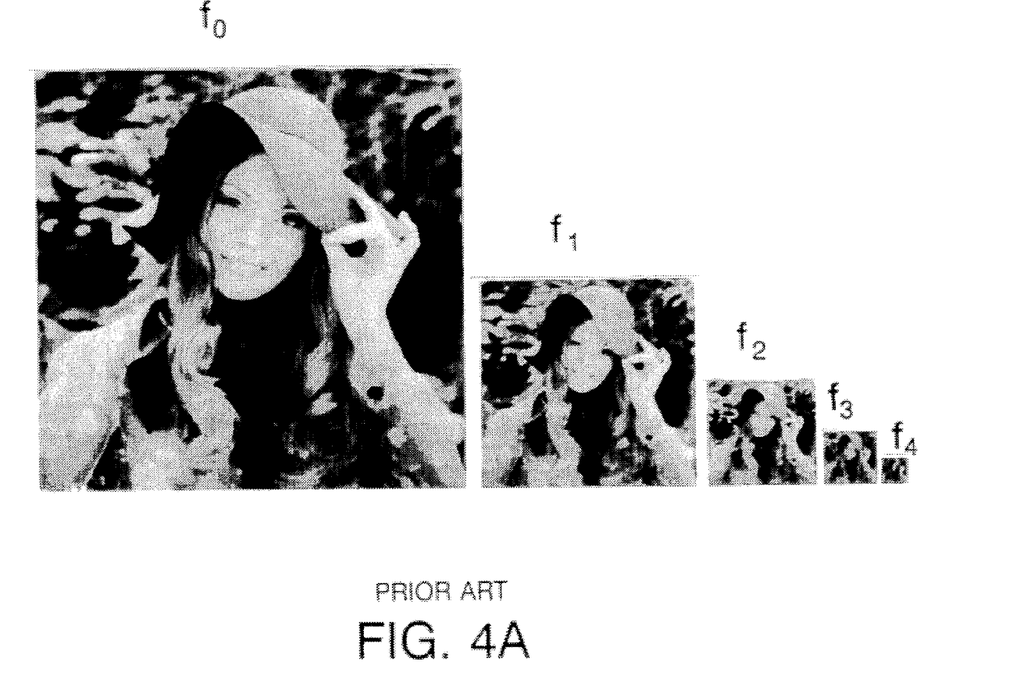
FIGS. 4A and 4B show prior art multi-scale representation schemes in which the total number of pixels employed exceeds the number of pixels in the original image.
Figure 4B:
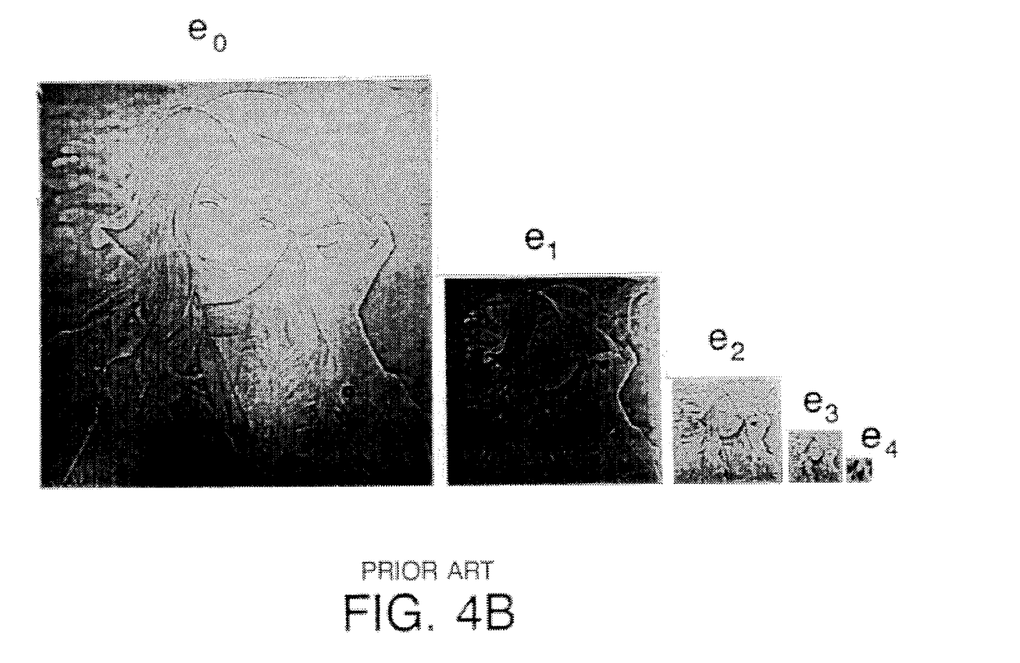

A variation on subband coding is Laplacian pyramid coding, as discussed in Lim, J. S., *Two-Dimensional Signal and Image Processing*, Prentice Hall, pp. 632–640 (1990). The original image $f_0$ (FIG. 4A) is successively lowpass filtered and subsampled, to produce a "pyramid" of successively lower frequency, subsampled images, e.g., $f_1$, $f_2$, $f_3$, and $f_4$ shown in FIG. 4A. The lowest frequency images have relatively fewer values, but the total number of values is greater than the number of pixels in the original image. In Laplacian pyramid coding, there is generated a difference "image" or high-frequency residual, $e_k$, consisting of the difference between the original image $f_k$ and a predicted version of the original image, produced by interpolating the next lower band image $f_{k+1}$ The coded representation of the image consists of the series of difference "images" $e_0$, $e_1$, $e_2$, and $e_3$ and the lowest-subsampled image, $f_4$ (FIG. 4B). At the decoder, the original image is rebuilt by starting with the lowest-subsampled image $f_4$, and adjoining difference $e_3$, to create a prediction of the next higher subsampled image $f_3$, and the process is repeated until a prediction of $f_0$ is generated. Such pyramid coding can lead to lower bit rates, but the total number of values used for representation of the original image is greater than the number of pixels in the original image.

Another approach to pyramidal coding of images uses variable bandwidths for the subbands to produce the same number of values as there are pixels in the image. Adelson, Edward H., Simoncelli, Eero, and Hingorani, Rajesh, *Orthogonal pyramid transforms for image coding*, In Proceedings of SPIE, Oct. 1987. Three high-frequency subbands are transmitted, each occupying one-fourth of the number of values as there are pixels in the original image. One subband contains high-frequency-vertical and high-frequency-horizontal information, and the other two contain low-frequency-vertical/high-frequency-horizontal and high-frequency-vertical /low-frequency-horizontal information. The remaining one-fourth of the values are similarly divided into narrower-bandwidth subbands; three of the subbands contain higher frequency information and occupy three-fourths of the remaining values; the remaining one-fourth is further subdivided in the same manner.

All of the discussion so far has not made a distinction between luminance and chrominance components of the television signal. Typically, there are three components transmitted—Y, I, and Q. The Y, or luminance, component ("luma") represents the intensity of the image. The I and Q, or chrominance, components ("chroma") represent the color of the image. Higher resolution is normally reserved for the luma (e.g., about 85% of the bit rate), because the eye is ordinarily tolerant of high spatial frequency errors in the chroma. Chroma is normally filtered and subsampled (e.g., by a factor 2×2 to 4×4), to eliminate the highs, to which the eye is not normally sensitive. This works well for natural images, but tends to fail for slowly-moving text and similar images. The low resolution of the chroma tends to produce undesirable artifacts such as "bleeding" of colors at the character edges. Text, graphics, synthetic imagery, and other high-resolution source material will likely be important sources of material for HDTV systems, and subsampling chroma will introduce inherent degradations.

Known techniques for reducing the number of bits to be transmitted are runlength-amplitude representation and statistical coding. Runlength-amplitude representation takes advantage of the fact that there are typically long strings of zeros in coded images, particularly when motion compensation is used, and what is coded is the residual between the actual image and a motion-compensated prediction of the image.

Statistical coding (e.g., Huffman coding) relies on creation of a "codebook" relating possible transmitted signal values to the strings of bits that will represent them in the transmitted signal. To reduce, on average, the number of bits to be transmitted, the signal values most frequently transmitted are assigned to the shortest bit strings, and longer strings are used for less likely signal values, so that the length of the bit string is inversely related to the likelihood of occurrence of the signal value being transmitted.

Runlength-amplitude representation and statistical coding have been applied to transmission of transform-coded images. Each block of a DCT-transform-coded image is scanned to produce runlength-amplitude pairs, with one number of each pair representing the length of the string of zeros and the other number representing the non-zero value. A Huffman codebook is developed based on expected statistics of all such runlength-amplitude pairs, and the same codebook is used repeatedly for each block of the image.

Using statistical coding complicates the coding process in that it produces variability in the number of bits to be transmitted across what is ordinarily a fixed capacity channel. The conventional solution is to provide a large buffer (e.g., 10–20 frames in size) with feedback to the quantizer. As the buffer fills, the quantizer is made more coarse; this reduces the entropy of the quantizer output and avoids overflow. Similarly, as the buffer empties, the quantizer is made more fine. Some care is required to ensure stability and to ensure that the buffer can never overflow or underflow ("last-ditch" quantizer modes and bit-stuffing, respectively).

SUMMARY OF THE INVENTION

We have discovered that very significant improvements in image quality can be had by using multi-scale representation of motion compensated residuals. The bandwidths of the subband filters vary with the frequency band and the total number of coefficients in the multi-scale-represented frames is equal to the number of values in the residual. Unlike the traditional transform or subband representation, where the bandwidth of each band is the same and the resulting filters have the same lengths, multi-scale representation uses shorter filters for higher frequency bands. The energy contribution of higher frequency bands comes primarily from busy image details such as edges. Shorter filters spread out the energy of such signals less, making the coder more efficient. In addition, the difference in filter size ensures that the different filters do not extend to the same location, thus reducing blocking effect.

Another aspect of our invention is the discovery of a more generalized approach to multi-scale representation, an approach applicable both to motion-compensated residuals and images. Multi-scale representation is done not only in the lowest subband, but in other subbands, as well.

In a further aspect, our invention features varying the leakage factor for different frequency subbands, and preferably injecting less of the original image into the high subbands (e.g., 0.995 of the predicted frame is used for high subbands, and thus only 0.5% of the original frame is injected into these bands, whereas 4% of the original image is injected into the DC subband). This variation in leakage factor produces some remarkable results. By injecting less of the original image into the high subbands, there is less loss of accuracy in the transmission of those most important bands, where most of the information in the residual is present. While at first it might seem that using a smaller leakage factor for the high subbands would be counterproductive in that it would mean a slower acquisition by the receiver, it turns out that slower acquisition of highs is hardly noticeable. On the other hand, providing greater leakage for the low subbands makes a noticeable improvement in perceived image acquisition speed in the receiver. Instead of a dark screen appearing immediately following a channel change, the invention provides almost immediate acquisition of the DC and very low subbands, which, though blurry, are augmented rapidly enough by the mid and high subbands that perceived image quality is excellent. In preferred embodiments, the DC time constant is about ¼ second, the midrange time constant is about ¾ second, and the high subband time constant is about 3 seconds.

In a further aspect related to motion compensation, the invention features making a global (i.e., substantially framewide) decision as to whether to motion compensate a particular frame. The motion estimator makes the global decision not to motion compensate when the difference between the current and past image frames is so great and so widespread across the frame as to expect with a high degree of probability that a scene change has occurred. A single bit is preferably used to transmit this global original/residual decision to the decoder. By making a global decision, the bits normally dedicated to transmitting the motion vectors can be used to transmit the original frame. This is advantageous in as much as it is precisely in such a situation that additional channel capacity is needed because the much higher energy original image is being sent rather than the residual. By not sending the motion vectors, an additional 5–10% additional channel capacity is made available.

In another aspect, the invention features an improved technique for providing both receiver initialization and good scene change accommodation. A leakage factor (which can be constant or vary with the frequency of the subband) is used for initialization, and to avoid the unattractive ghost of the previous scene persisting for a short time in a new scene, the motion estimator makes a decision on a block-by-block basis whether to use the original image or the residual.

The invention also features a method of improving chrominance resolution. All subbands of the chroma residual (or residuals) are encoded (by contrast to the conventional technique of encoding only low subbands), but the chroma residual is encoded at relatively coarser quantization than the luma residual. When the energy of the luma residual is low (as, e.g. may occur when there is little motion), chroma quantization is improved, by reducing quantization step size. Preferably, both luma and chroma quantization are improved in unison, with the relative coarseness between luma and chroma preserved; this has the potential of simplifying hardware implementation, as it allows all three channels (Y, I, and Q residuals) to be substantially identical. By improving chroma quantization at times of low luma energy, chroma artifacts such as text bleeding are reduced, without any degradation in luma resolution. In the preferred arrangement, in which both luma and chroma quantization step sizes are reduced in such low energy periods, both luma and chroma resolution are improved. Preferably, the factor by which quantization step size is reduced is adaptively chosen so that step size varies with available bit rate.

Other aspects of the invention relate to runlength-amplitude representation and statistical coding. Runlength-amplitude representation is applied to entire subbands, and, preferably, different codebooks are used in statistically coding different subbands, to take advantage of the different statistics in the different subbands (e.g., long runlengths are more likely for higher frequency subbands). Different codebooks are also preferable for the three different residuals, Y, I, and Q. An advantage of using subband filtered signals relative to transform coded blocks is that the size of the subband filtered signal is typically much larger, allowing more spatial correlation to be exploited.

A further aspect of the invention is adaptively varying the quantization size based on a computation of the number of bits necessary to statistically code a particular frame. This guarantees for each frame exactly (or approximately, if a small buffer is provided in the decoder) the number of bits available in the channel. The quantization size is varied (e.g., by varying a scale factor used to multiply the weighted residuals prior to quantization) until a size is found that, when statistically coded, produces the desired number of bits. Preferably, the choice of quantization size is done iteratively, until a size is found that produces a number of bits sufficiently close to (but less than) the number that the channel can accommodate (the remaining capacity is stuffed with unused bits). Alternatively, a small buffer in the decoder can accommodate the differences.

This aspect of the invention would seem, at first, to have significant disadvantages, in that by fixing the number of bits to be allocated to each frame, it means that the first few (e.g., three or four) frames following scene changes will usually have worse resolution than would have been the case if quantization size were not adaptively chosen as described. A more conventional encoder, for example, would typically produce more than an average number of bits for these frames because their energy would be higher than an average residual. But it turns out that this loss of fidelity in the frames following a scene change is not noticeable by the user. Furthermore, by substantially eliminating the buffer of conventional system, the delay of those systems in adapting the quantization coarseness is avoided. A further seeming disadvantage of this feature of the invention is the added complexity of iteratively searching for the best quantization size, but the added complexity, because it is only at the transmitter, allows simplifications at the receiver— —frame synchronization is simpler, demultiplexing video from audio and ancillary digital services is simpler, and there is no need for the buffer conventionally used for handling variable bit rates.

Other advantages and features of the invention will be apparent from the following description of a preferred embodiment of the invention and from the claims.

DESCRIPTION OF THE PREFERRED EMBODIMENT

Figure 1:
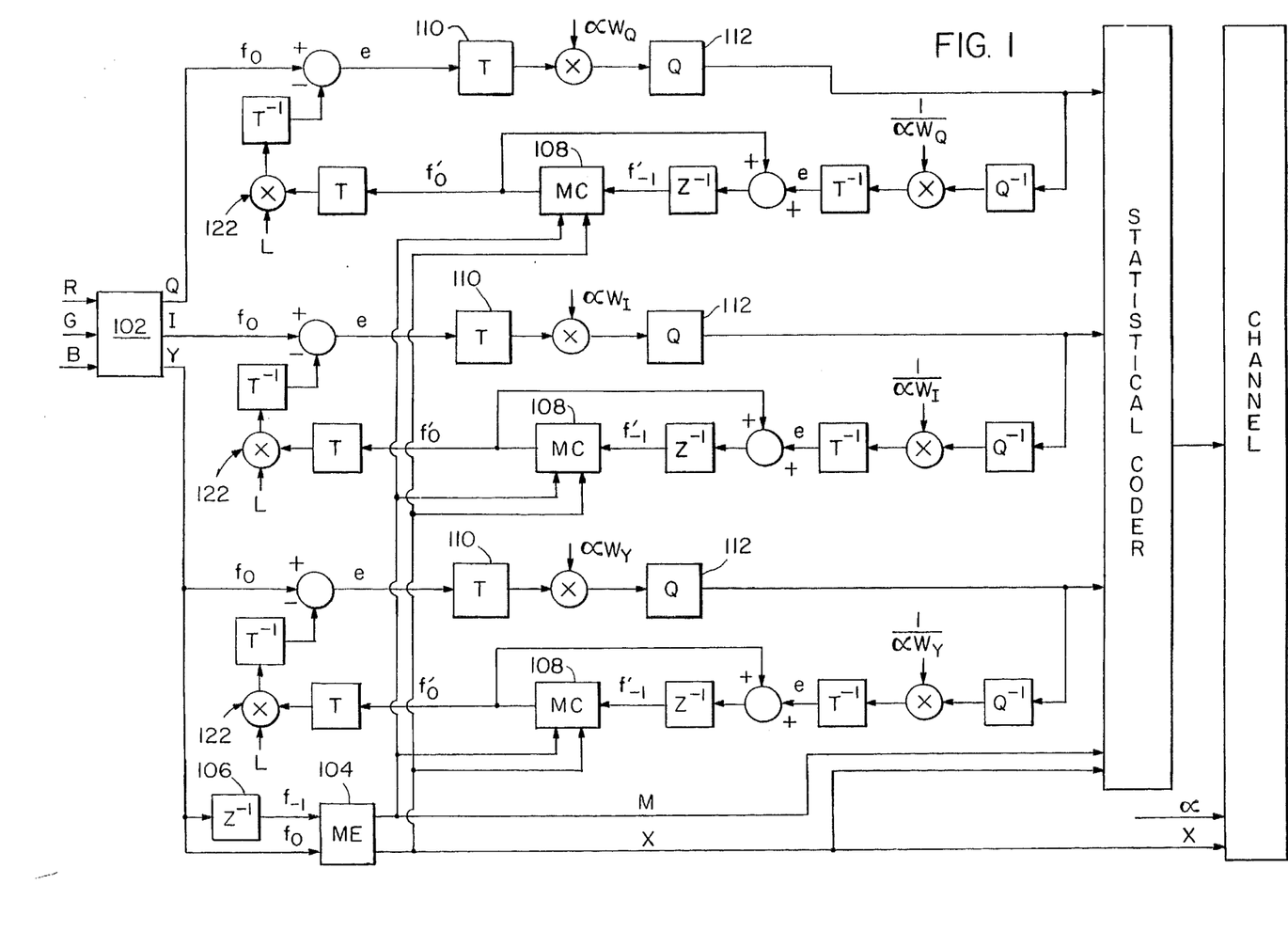
FIG. 1 is a block diagram of the preferred encoder of the invention.

FIG. 1 shows the preferred encoder. RGB image frames from a television camera or other source are transformed at block 102 into a YIQ representation, where the Y frame is the luminance component of the image, and I and Q frames are the chrominance components. Frame size is 720×1280 pixels.

The luminance frame is provided to motion estimator 104, which compares the current luminance frame $f_0$ to the previous luminance frame $f_{-1}$ which has been stored in frame delay buffer 106. The motion estimator uses techniques disclosed in U.S. Pat. No. 4,838,685 (incorporated herein by reference) to produce a frame of motion vectors M, which are supplied to motion compensators 108 in each of encoding paths for the YIQ components. The block size for the motion estimator is 16×16, and the motion vectors M are 3,600 pairs of x, y estimated motion displacements, one for every 16×16 block in the image.

The motion estimator may optionally also produce a single-bit indicator x that instructs each of the motion estimators not to perform motion compensation on any blocks in the current frame.

Figure 3A:
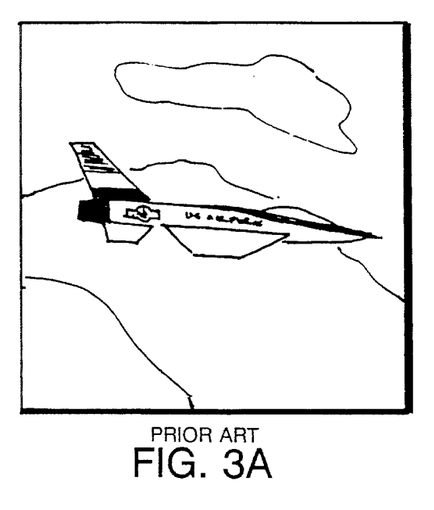
FIG. 3A shows an image frame $f_0$ as supplied to the coder.
Figure 3B:
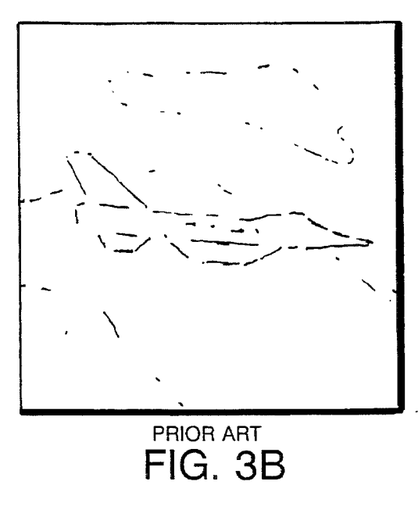
FIG. 3B shows the residual $e_0$ prior to multi-scale coding.
Figure 3C:
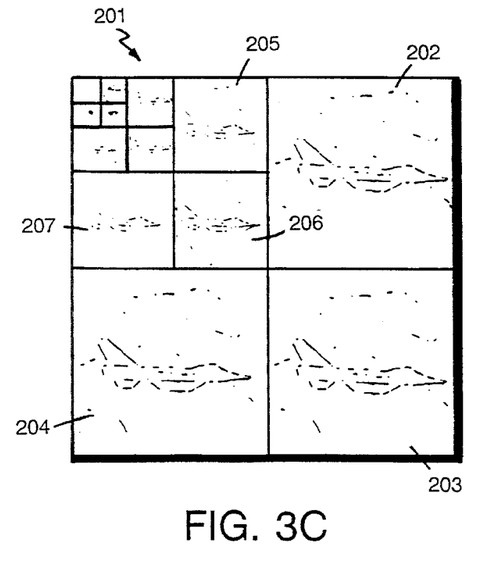
FIG. 3C shows the multi-scale-represented residual.

Each of the YIQ frames is encoded similarly. The current image frame $f_0$ $(n_1, n_2)$, an example of which appears in FIG. 3A, and which is 720×1280 pixels, is supplied to a comparator. The residual e $(n_1,n_2)$ (illustrated in FIG. 3B), or difference, between the current image frame $f_0(n_1, n_2)$ and a predicted current frame $f'_0$ $(n_1,n_2)$ is supplied to a multi-scale, subband coder 110, which produces a multi-scale-analyzed residual $e_{i,j}$ $(l_1,l_2)$ (illustrated in FIG. 3C).

The multi-scale, subband coder 110 generates a frame 201 (illustrated in FIG. 3C) having the same number of pixels (720×1280) as the residual, but with subbands that vary in bandwidth, and that correspondingly vary in degree of subsampling. The highest frequency subbands 202, 203, 204 each occupy one-fourth of the original number of pixels in the residual. The lowest frequency subband has been further subdivided. Three subbands 206, 207, 208 each occupy one-fourth of the subband, and the lowest frequency subband is further subdivided. This multi-scaling of subbands is continued for four levels (although more or less could be used). The smallest subband block (at the upper left in FIG. 3C) corresponds to DC and is 45×80 pixels.

Figure 5:
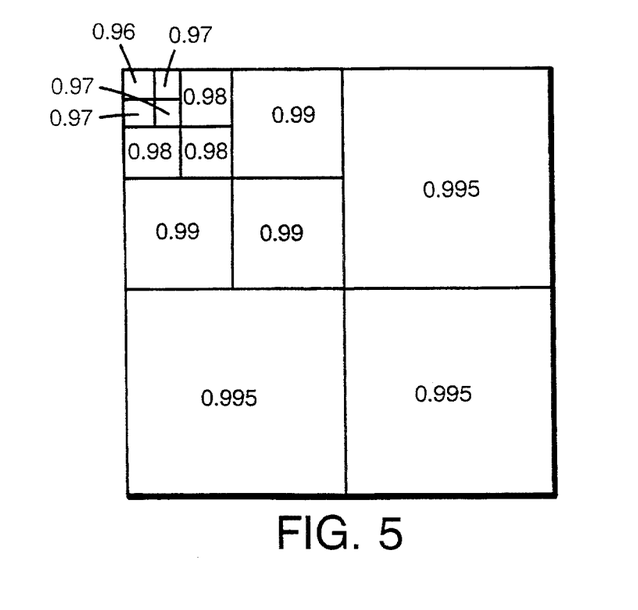
FIG. 5 shows the leakage-factor weighting given the predicted image frame in computing the various subbands of the multi-scale representation.

The multi-scale coder multiplies the predicted image frame $f'_0$ by a variable factor, to accomplish the variability in leakage factor with subband. As shown in FIG. 5, the predicted frame is multiplied by 0.995 in the highest subbands, and by 0.99, 0.98, and 0.97 in the next three lower bands, respectively. The DC band (upper left in the figures) is multiplied by 0.96. The leakage-factor constants L are implemented by multiplying the multi-scale-represented frames as shown in FIG. 1 at multipliers 122.

Figure 7:
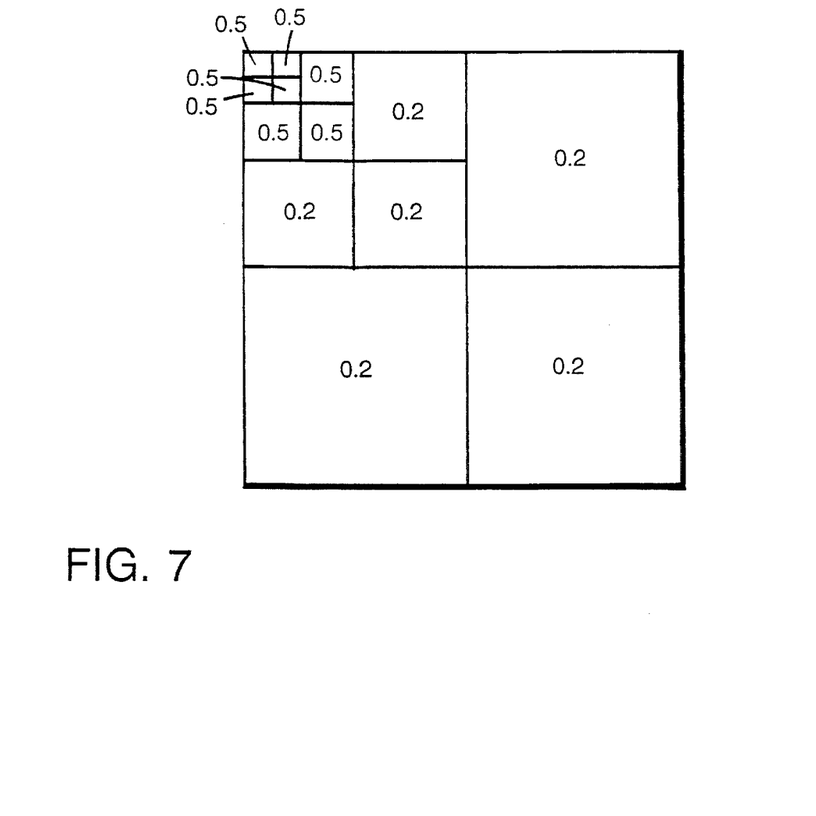
FIG. 7 shows the relative weights $W_I$, $W_Q$ used to produce coarser quantization of the chrominance components relative to the luminance component.

In order to vary the coarseness of quantization performed on the multi-scale-analyzed residual, the residuals are multiplied by variable weighting factors $\alpha W_y$, $\alpha W_I$, $\alpha W_Q$. The weights $W_y$, $W_I$, $W_Q$ are fixed and vary for the different frequency components. The weight for luminance is 1.0. The weights for the chrominance components are given in FIG. 7 for each of the subbands. The weights vary with the subband, being less for higher frequency bands than for the low frequency bands. Factor $\alpha$ is a variable scale factor, applied to each component, to achieve an overall increase or decrease in quantization coarseness. Factor $\alpha$ is encoded, and serves in the decoder as a quantization step size indicator.

The weighted residual for each of the YIQ components is supplied to quantizer 112, and the quantized outputs are statistically coded and transmitted across the channel. The statistical coding comprises runlength-amplitude representation, followed by Huffman coding of the amplitude/runlength pairs. The motion vectors are treated in the same manner, except that, if bit x indicates on a global basis that no motion compensation is to be done for the current frame, the motion vectors are not coded, thereby providing additional channel capacity for transmission of the YIQ components.

A relative difference in quantization step size, and thus in image quality, is provided between the luminance residual and the two chrominance residuals. This is achieved using fixed weights $W_y$, $W_I$, $W_Q$, as discussed above and shown in FIG. 7. The same quantizers are used for all three components, and thus the difference in weights has the effect of providing finer quantization of the luma residual. The more coarsely quantized chroma components tend to have lower entropy because of the greater number of zeros, and thus consume fewer bits in the encoded signal. A roughly 85/15 split is made between the luma and chroma components, i.e., 85% of the bits used to encode the residuals are used to encode the luma, and only 15% to encode the two chroma components.

Figure 6:
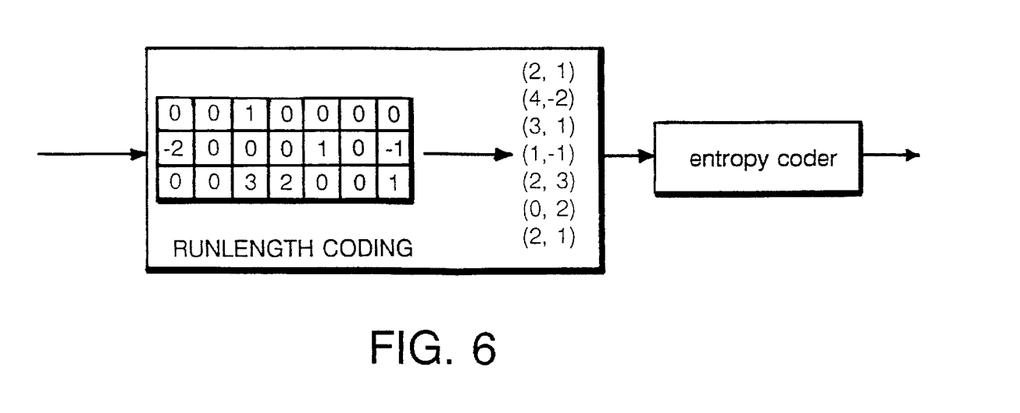
FIG. 6 shows the runlength-amplitude representation and entropy coding performed on the quantized, subband-filtered residuals.
Figure 8:
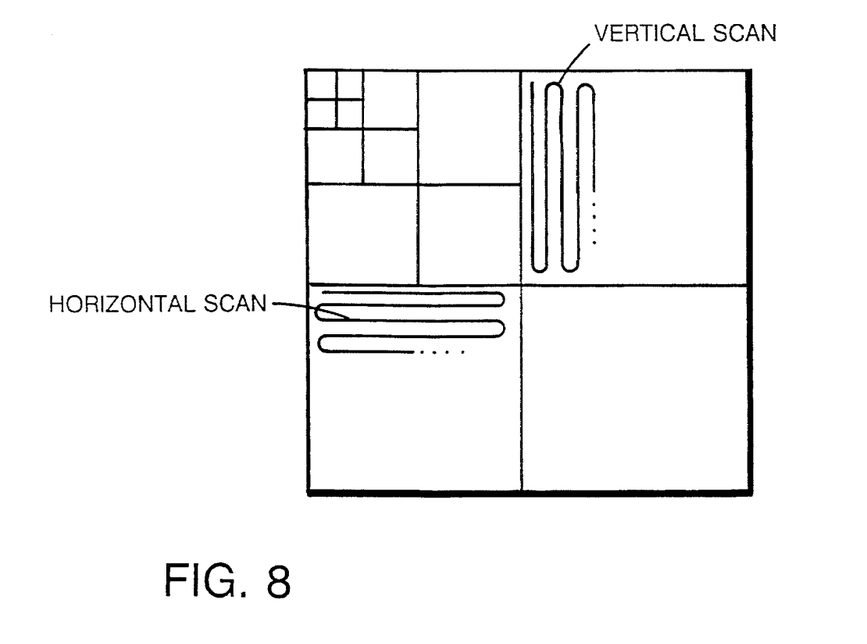
FIG. 8 shows the different scanning directions for subband-filtered residuals for different frequency bands.

The quantized residuals are runlength-amplitude represented and coded using Huffman entropy coding (FIG. 6). Each residual frame is serpentine scanned (raster and other alternatives could also be used), to generate runlength-amplitude pairs of numbers, with one number representing the number of intervening zeros and the other number the non-zero residual value. The direction of the serpentine scan is different (as shown in FIG. 8 for the highest bands; the same different scan direction is used in lower bands) depending on whether it is the high-horizontal/low-vertical band or the low-horizontal/high-vertical band that is being processed. Either scan direction may be used in the high-horizontal/high-vertical band. The relationship between coefficients and runlength-amplitude pairs is illustrated in FIG. 6 for a small, illustrative section of a frame. The runlength-amplitude pairs are then entropy coded using Huffman coding (FIG. 6). Different codebooks are used, however, for the different subbands, to take advantage of the different statistics in the different bands. For example, in the highest subbands, the residuals may be extremely sparse; e.g., it may be likely to have runlengths (i.e., strings of zeros) of a thousand or more. Yet lower frequency subbands may be considerably less sparse; e.g., runlengths of 50 may be likely. The actual codes used in the codebook can be readily selected by observing many actual coded images, and assigning runlength/amplitude pairs to bit strings according to the statistical likelihood of the runlength/amplitude pairs, in a manner known for Huffman coding.

The Huffman coding should, on average, produce a bit rate that matches the channel capacity. Yet any actual frame is likely to require a larger or smaller number of bits. Rather than rely on a large buffer in the receiver to accommodate the variation in bit rates from frame to frame, computations are performed prior to transmission to determine a weighting factor $\alpha$ that produces exactly (or, if a small buffer is provided, approximately) the number of bits available for each frame.

The value of $\alpha$ that produces the desired number of bits is found using a search procedure. The search starts with a small value of $\alpha$, one that is small enough that it can be expected to produce fewer bits than the channel has available. The actual number required is computed using the codebook and the Huffman coder. That process of choosing an $\alpha$ and computing the number of bits required is repeated for a value of $\alpha$ that is large enough that it should produce more bits than are available. A mid-point subdivision search algorithm, for example, is then followed, until an $\alpha$ that nearly exactly matches the available capacity is found. It is expected that other search algorithms may be better suited to the task of finding $\alpha$.

The motion vectors are also transmitted using a codebook chosen to best match the statistics of those vectors. When a global decision is made not to transmit motion vectors, the number of bits available for transmitting the image residuals is increased. This is taken into account in computing the value of α for that frame, and the added bits produce higher fidelity than would otherwise be obtained.

Figure 2:
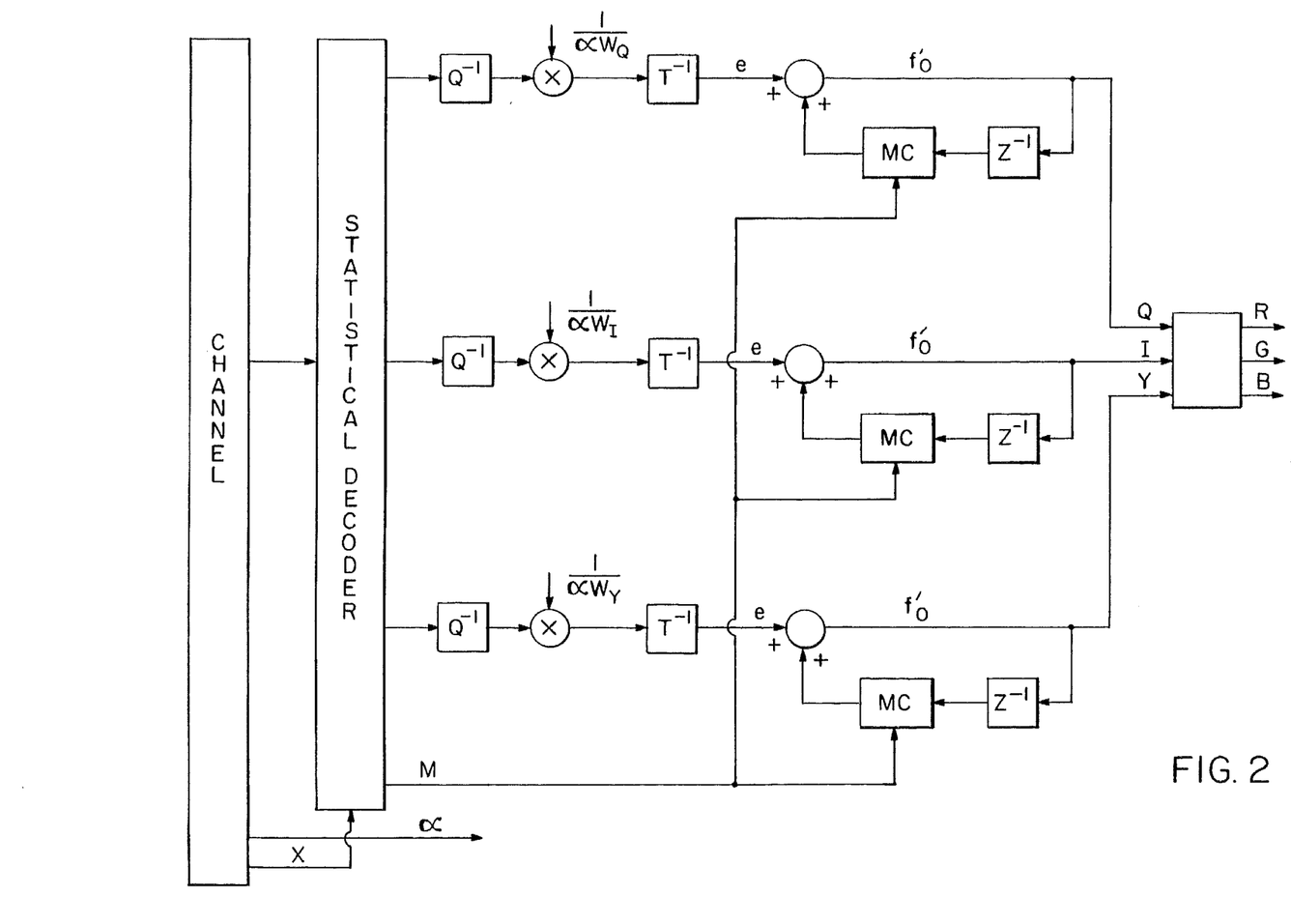
FIG. 2 is a block diagram of the preferred decoder of the invention.

The decoder of FIG. 2 inverts the operation of the encoder to reconstruct the YIQ frames. The decoder combines the residual frame with a motion compensated prediction of the current image frame using the inverse of the steps followed in the encoder. If the single-bit indicator x is set, the decoder generates the actual image frame without using motion compensation.

Other embodiments are within the following claims. The invention includes other features of the invention described in the foregoing sections, and further claims to these may be added.

Figure 3D:
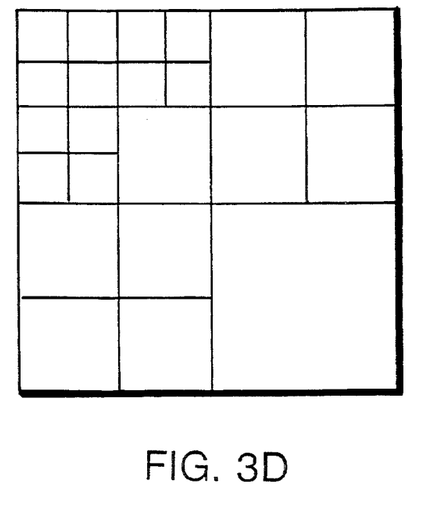
FIG. 3D shows an alternative multi-scale representation scheme, useful not only for residual coding but also for image coding.

Many modifications can be made to the preferred embodiment described herein without departing from the invention. The various choices for weights, block sizes, numbers of pixels, leakage factors, numbers of subbands, motion estimation techniques, as well as other specific features disclosed can be modified. Some of the features of the invention can be applied to other image coding technqiues; e.g., the alternative multi-scale representation scheme (shown in FIG. 3D) can also be used for direct image coding.

We claim:

1. A method of encoding television images comprising the steps of:

forming a predicted current image frame by motion compensating a prior reconstructed image frame;

coding a residual frame using subband representation, the subbands being formed by scaling the predicted current image frame relative to an actual current image frame so that a fraction of the current image is injected into the residual frame, the amount of the current image injected varying between subbands; and quantizing the subband-represented residual frame.

2. The method of claim 1 wherein the fraction of the current image injected into the subbands of the residual frame is lower for higher frequency subbands.

3. The method of claim 2 wherein the fraction of the current image injected into the subbands of the residual frame is lowest for the highest frequency subband and highest for the lowest frequency subband.

4. The method of claim 1, 2, or 3 wherein the subband representation is multi-scale representation in which the subband filtering is performed with filter bandwidths that vary with frequency (the bandwidth being generally narrower at lower frequencies), and in which the total number of resulting coefficients in the multi-scale-represented frame is substantially equal to the number of values in the residual frame.

5. The method of claim 4 wherein the subband representation includes block transform representation such as the DCT.

6. A method of decoding television images comprising the steps of:

forming a predicted current image frame;

receiving and decoding a quantized subband-represented residual frame; and reconstructing a current frame by combining the decoded residual frame and a fraction of said predicted current image frame in each of a plurality of frequency subbands.

7. The method of claim 6 wherein the fraction used is not the same for all frequency subbands.

8. The method of claim 7 wherein the fraction is higher for higher frequency subbands.

9. The method of claim 8 wherein the fraction is highest for the highest frequency band and lowest for the lowest frequency band.

10. A method of decoding television images comprising the steps of:

forming a predicted current image frame;

receiving and decoding a quantized subband-represented residual frame; and reconstructing a current frame by combining the decoded residual frame and a fraction of said predicted current image frame in each of a plurality of frequency subbands;

wherein the subband representation is multi-scale representation in which the subband filtering is performed with filter bandwidths that vary with frequency (the bandwidth being generally narrower at lower frequencies), and in which the total number of resulting coefficients in the multi-scale-represented frame is substantially equal to the number of values in the residual frame.

11. The method of claim 10 wherein the subband representation includes block transform representation such as the DCT.

12. A method of decoding a television signal comprising the steps of:

decoding the television signal to determine the state of an indicator that specifies for an entire received frame whether the received frame is an actual image frame; and if the indicator specifies that the frame is an actual image frame, decoding the frame to form the actual image frame and using the decoded frame without motion compensation.

13. A method of decoding television images, comprising the steps of:

decoding a television signal to determine the state of indicators that indicate whether individual blocks of a received frame represent blocks of the image or blocks of a residual;

for those blocks that represent a residual, forming that block of the image by motion compensating a corresponding block from a prior image and adding the decoded residual to the motion-compensated block;

for those blocks that represent the actual image, using the decoded block without motion compensation; and relying for initialization, or reduction of the effect of bit errors, on those blocks that represent the actual image.

14. A method of encoding television images, comprising the steps of:

forming a predicted current image frame by motion compensating a prior image frame using a frame of motion vectors;

forming a residual frame by determining the difference between an actual current image frame and a fraction of the predicted current image frame, so that the residual frame comprises fractions of the current image for assisting a decoder in initialization or in reducing the effect of bit errors;

estimating the motion in the image on a block-by-block basis and using the estimate to form the frame of motion vectors, one vector for each block;

deciding on a block-by-block basis whether, for a particular frame, in light of a motion estimate consistent with a scene change or with motion too fast to compensate, it is better to code the actual current image for a particular block instead of the residual frame;

coding indicators, for use in decoding, that specify on a block-by-block basis whether the residual or the actual image has been encoded; and quantizing the encoded image for each block in the particular frame.

15. The method of claim 10 wherein the fraction used is not the same for all frequencies subbands.

16. The method of claim 10 wherein the fraction is higher for higher frequency subbands.

17. The method of claim 10 wherein the fraction is highest for the highest frequency band and lowest for the lowest frequency band.

* * * * *

UNITED STATES PATENT AND TRADEMARK OFFICE
CERTIFICATE OF CORRECTION

| | | |
|---|---|---|
| PATENT NO. | : 5,485,210 | Page 1 of 1 |
| APPLICATION NO. | : 08/072738 | |
| DATED | : January 16, 1996 | |
| INVENTOR(S) | : Jae S. Lim et al. | |

It is certified that error appears in the above-identified patent and that said Letters Patent is hereby corrected as shown below:

Cover page, [*] Notice should read: The portion of the term of this patent subsequent to Feb. 20, 2011, has been disclaimed.

Signed and Sealed this
Fifteenth Day of February, 2011

David J. Kappos
*Director of the United States Patent and Trademark Office*